United States Patent
Choi et al.

(10) Patent No.: US 11,634,114 B2
(45) Date of Patent: *Apr. 25, 2023

(54) APPARATUS AND METHOD FOR CONTROLLING HYBRID VEHICLE HAVING ELECTRIC SUPERCHARGERS

(71) Applicants: Hyundai Motor Company, Seoul (KR); Kia Motors Corporation, Seoul (KR)

(72) Inventors: Yong Kak Choi, Seoul (KR); Hyun Woo Lim, Gyeonggi-do (KR); Buhm Joo Suh, Gyeonggi-do (KR); Jinkuk Cho, Gyeonggi-do (KR); Kwanhee Lee, Gyeonggi-do (KR); Sungchan Na, Gyeonggi-do (KR); Yeongseop Park, Seoul (KR); Jihyun Park, Gyeonggi-do (KR); Seungwoo Hong, Seoul (KR); Dong Hee Han, Seoul (KR); Hyunjin Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 116 days.

This patent is subject to a terminal disclaimer.

(21) Appl. No.: 16/696,390

(22) Filed: Nov. 26, 2019

(65) Prior Publication Data
US 2021/0046919 A1 Feb. 18, 2021

(30) Foreign Application Priority Data
Aug. 12, 2019 (KR) .................. 10-2019-0098178

(51) Int. Cl.
*B60W 20/13* (2016.01)
*F02B 39/10* (2006.01)
(Continued)

(52) U.S. Cl.
CPC .............. *B60W 20/13* (2016.01); *B60K 6/38* (2013.01); *B60L 50/10* (2019.02); *B60L 50/66* (2019.02);
(Continued)

(58) Field of Classification Search
CPC ....... B60W 20/13; B60W 20/00; B60L 1/003; B60L 58/12; B60L 50/10; F02D 23/00;
(Continued)

(56) References Cited

U.S. PATENT DOCUMENTS

| 6,478,100 B1 * | 11/2002 | Grewe | B60W 10/30 |
| | | | 903/905 |
| 7,107,972 B1 * | 9/2006 | Jones | F02B 33/34 |
| | | | 123/559.1 |

(Continued)

FOREIGN PATENT DOCUMENTS

| JP | 2004076687 A | * | 3/2004 |
| JP | 2004092455 A | * | 3/2004 |

(Continued)

OTHER PUBLICATIONS

EPO machine translation of JP 2005-240580 (original JP document published Sep. 8, 2005) (Year: 2005).*

(Continued)

*Primary Examiner* — David A Testardi
(74) *Attorney, Agent, or Firm* — Fox Rothschild LLP

(57) ABSTRACT

An apparatus and a method for controlling a hybrid vehicle are provided. The apparatus includes an engine that generates power by combusting fuel and a drive motor that supplements the power from the engine and operates selectively as an electric generator to produce electrical energy. A clutch is disposed between the engine and the drive motor and a battery supplies electrical energy to the drive motor and is charged with the electrical energy produced by the drive motor. Multiple electric superchargers are installed in multiple intake lines through which outside air to be supplied into a combustion chamber of the engine flows. A controller determines an operation mode of the multiple electric superchargers based on required power of a driver and a state of charge (SOC) of the battery and adjusts the power output from the engine and the power output from the drive motor.

9 Claims, 15 Drawing Sheets

(51) Int. Cl.
  *B60L 50/60* (2019.01)
  *B60L 58/12* (2019.01)
  *B60L 50/10* (2019.01)
  *B60K 6/38* (2007.10)
  *B60W 10/06* (2006.01)
  *B60W 10/08* (2006.01)
  *F02D 41/00* (2006.01)
  *B60K 6/46* (2007.10)

(52) U.S. Cl.
  CPC ............ *B60L 58/12* (2019.02); *B60W 10/06* (2013.01); *B60W 10/08* (2013.01); *F02B 39/10* (2013.01); *F02D 41/0007* (2013.01); *B60K 6/46* (2013.01); *B60W 2510/085* (2013.01); *B60W 2510/244* (2013.01); *B60Y 2200/92* (2013.01); *F02D 2200/503* (2013.01); *F02D 2200/602* (2013.01)

(58) Field of Classification Search
  CPC ............ F02D 41/007; F02D 2200/503; F02D 41/0007; F02B 39/10; F02M 35/10157; F02M 35/10163; F04D 17/12; F04D 17/14; F04D 27/0269; B60K 6/24; B60K 6/38
  See application file for complete search history.

(56) References Cited

U.S. PATENT DOCUMENTS

| | | | | |
|---|---|---|---|---|
| 7,107,973 | B1 * | 9/2006 | Jones | ............... F02B 33/44 123/559.1 |
| 9,534,532 | B2 * | 1/2017 | Eybergen | ............ F02B 33/38 |
| 11,433,878 | B2 * | 9/2022 | Choi | ................ F02D 41/0052 |
| 11,485,351 | B2 * | 11/2022 | Park | .................. B60W 20/15 |
| 11,506,140 | B1 * | 11/2022 | Park | .................. F02D 41/1475 |
| 11,548,493 | B2 * | 1/2023 | Oh | ......................... B60K 6/24 |
| 2003/0110771 | A1 * | 6/2003 | Morgan | ................. F02B 39/10 60/608 |
| 2008/0087482 | A1 * | 4/2008 | Ledger | ................. B60K 6/445 180/165 |
| 2009/0026838 | A1 * | 1/2009 | Abe | ......................... H02J 1/14 307/38 |
| 2010/0314186 | A1 * | 12/2010 | Ma | .......................... F02B 29/00 180/165 |
| 2013/0255647 | A1 * | 10/2013 | Akashi | .................... F02D 29/06 123/559.1 |
| 2014/0238361 | A1 * | 8/2014 | Tsourapas | .............. F02B 39/04 123/562 |
| 2015/0377158 | A1 * | 12/2015 | Benjey | ............... F02D 41/0007 701/22 |
| 2017/0152801 | A1 * | 6/2017 | Lofgren | ............... B60W 20/14 |
| 2018/0163616 | A1 * | 6/2018 | Han | ..................... F02D 41/0007 |
| 2018/0361844 | A1 * | 12/2018 | Kinzuka | ............ F02D 41/0007 |
| 2019/0003408 | A1 * | 1/2019 | Hata | ..................... B60W 20/19 |
| 2019/0143821 | A1 * | 5/2019 | Bell | ....................... B60L 53/11 180/65.225 |
| 2019/0276004 | A1 * | 9/2019 | Takasu | .................... F02D 23/02 |
| 2021/0179067 | A1 * | 6/2021 | Choi | ................. F02M 35/10157 |
| 2022/0074812 | A1 * | 3/2022 | Lim | ....................... F02B 39/10 |

FOREIGN PATENT DOCUMENTS

| | | | |
|---|---|---|---|
| JP | 2005240580 A | * | 9/2005 |
| JP | 2005330818 A | * | 12/2005 |
| JP | 2013132920 A | * | 7/2013 |
| JP | 2013181393 A | * | 9/2013 |
| KR | 101481283 B | | 1/2015 |

OTHER PUBLICATIONS

European Search Report dated May 27, 2020 in counterpart European Application No. 19210817.3.

* cited by examiner

APPARATUS AND METHOD FOR CONTROLLING HYBRID VEHICLE HAVING ELECTRIC SUPERCHARGERS

CROSS-REFERENCE TO RELATED APPLICATION

This application claims priority to and the benefit of Korean Patent Application No. 10-2019-0098178 filed on Aug. 12, 2019, the entire contents of which are incorporated herein by reference.

BACKGROUND

(a) Field of the Invention

The present invention relates to an apparatus and a method for controlling a hybrid vehicle having electric superchargers, and more particularly, to an apparatus and a method for controlling a hybrid vehicle which control a method of distributing power output from an engine and a drive motor based on a battery state of charge in a hybrid vehicle having two electric superchargers.

(b) Description of the Related Art

A hybrid vehicle refers to a vehicle that uses two or more types of power sources. In general, the hybrid vehicle refers to a hybrid electric vehicle that operates using an engine and a motor. The hybrid electric vehicle may implement various structures using two or more types of power sources including the engine and the motor. In general, the hybrid electric vehicle uses a power train of a transmission mounted electric device (TMED) type in which a drive motor, a transmission, and a driving shaft are connected in series.

Further, a clutch is disposed between the engine and the motor, and a hybrid electric vehicle travels in an electric vehicle (EV) mode or a hybrid electric vehicle (HEV) mode based on whether the clutch is engaged. The EV mode refers to a mode in which the vehicle travels using driving power from the drive motor, and the HEV mode refers to a mode in which the vehicle travels using driving power from the drive motor and the engine. In the hybrid vehicle, it is important to manage a state of charge (SOC) that refers to the amount of charge of a battery that supplies electric power to the drive motor and electrical components provided in the vehicle.

When a traveling load of a vehicle is high (e.g., a situation in which the vehicle travels at an ultrahigh speed, a situation in which the vehicle consistently travels up an inclined road, or a situation in which the vehicle travels at a high-altitude area) and the vehicle travels using only an output from the engine without the assistance of the drive motor when the SOC of the battery is low, a traveling speed decreases and fuel economy and exhaust gas deteriorate due to an excessive output from the engine and a high engine speed.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling a hybrid vehicle having electric superchargers, which are capable of improving a traveling performance of a vehicle and efficiently managing a state of charge (SOC) of a battery when a high traveling load is required in a low SOC situation.

An exemplary embodiment of the present invention provides an apparatus for controlling a hybrid vehicle having electric superchargers that may include: an engine configured to generate power by combusting fuel; a drive motor configured to supplement the power from the engine and operate selectively as an electric generator to produce electrical energy; a clutch disposed between the engine and the drive motor; a battery configured to supply electrical energy to the drive motor and be charged with the electrical energy produced by the drive motor; multiple electric superchargers installed in multiple intake lines through which outside air to be supplied into a combustion chamber of the engine may flow; and a controller configured to determine an operation mode of the multiple electric superchargers based on required power of a driver and a state of charge (SOC) of the battery and adjust power output from the engine and power output from the drive motor.

The required power may be determined based on an engagement degree of an accelerator pedal position sensor (APS) mounted within a vehicle and divided into a highest load state, a high load state, a middle load state, and a low load state. When the required power is in the highest load state and the SOC of the battery is a preset value or greater, the controller may be configured to operate the engine to output maximum power, determine the operation mode of the multiple electric superchargers so that the engine outputs the maximum power, and output the remaining power except for the maximum power from the engine from traveling power of the vehicle determined based on the required power from the drive motor.

Additionally, when the required power is in the highest load state and the SOC of the battery is a preset value or greater, the controller may be configured to supply the drive motor with the remaining power except for a sum of power made by adding up supercharger power required for the electric superchargers, electrical component power required for electrical components, and air conditioner power required for an air conditioner from the power that may be output from the battery, and output the traveling power generated by adding up drive motor power output from the drive motor and the maximum power from the engine.

When the required power is in the highest load state and the SOC of the battery is less than a preset value, the controller may be configured to operate the engine to output maximum power, determine the operation mode of the multiple electric superchargers so that the engine outputs the maximum power, and control a sum of power generated by adding up supercharger power required for the electric superchargers, electrical component power required for electrical components, and air conditioner power required for an air conditioner to supply a part of the power output from the engine through the drive motor that operates as an electric generator.

When the required power is in the high load state and the SOC of the battery is a preset value or greater, the controller may be configured to operate the engine to output maximum power, determine the operation mode of the multiple electric superchargers so that the engine outputs the maximum power, output the remaining power except for the maximum power from the engine from a traveling power determined based on the required power from the drive motor, supply the drive motor with the remaining power except for a sum of power made by adding up supercharger power required for the electric superchargers, electrical component power required for electrical components, and air conditioner power required for an air conditioner from the power that is to be output from the battery, and output the traveling power generated by adding up drive motor power output from the drive motor and the maximum power from the engine.

When the required power is in the high load state and the SOC of the battery is less than a preset value, the controller may be configured to operate the engine to output maximum power, determine the operation mode of the multiple electric superchargers so that the engine outputs the maximum power, control a sum of power generated by adding up supercharger power required for the electric superchargers, electrical component power required for electrical components, and air conditioner power required for an air conditioner to supply a part of the power outputted from the engine through the drive motor that operates as an electric generator.

When the required power is in the middle load state and the SOC of the battery is a preset value or greater, the controller may be configured to operate the engine to output optimum power so that the engine operates at an optimum efficiency point, determine the operation mode of the multiple electric superchargers so that the engine outputs the optimum power, output the remaining power except for the optimum power from the engine from traveling power determined based on the required power through the drive motor, supply the drive motor with the remaining power except for a sum of power generated by adding up supercharger power required for the electric superchargers, electrical component power required for electrical components, and air conditioner power required for an air conditioner from the power that is to be output from the battery, and output the traveling power generated by adding up drive motor power output from the drive motor and the optimum power from the engine.

When the required power is in the middle load state and the SOC of the battery is less than a preset value, the controller may be configured to operate the engine to output optimum power so that the engine operates at an optimum efficiency point, determine the operation mode of the multiple superchargers so that the engine outputs the optimum power, and control charging power for charging the battery and a sum of power generated by adding up supercharger power required for the electric superchargers, electrical component power required for electrical components, and air conditioner power required for an air conditioner to supply a part of the power output from the engine through the drive motor that operates as an electric generator.

When the required power is in the low load state and the SOC of the battery is a preset value or greater, the controller may be configured to output the engine to output optimum power so that the engine operates at an optimum efficiency point, stop operation of the multiple electric superchargers, output the remaining power except for the optimum power from the engine from traveling power determined based on the required power through the drive motor, supply the drive motor with the remaining power except for a sum of power generated by adding up supercharger power required for the electric superchargers, electrical component power required for electrical components, and air conditioner power required for an air conditioner from the power that is to be output from the battery, and output the traveling power generated by adding up drive motor power output from the drive motor and the optimum power from the engine.

When the required power is in the low load state and the SOC of the battery is less than a preset value, the controller may be configured to operate the engine to output optimum power so that the engine operates at an optimum efficiency point, stop operation of the multiple electric superchargers, and control charging power for charging the battery and a sum of power generated by adding up electrical component power required for electrical components and air conditioner power required for an air conditioner from the power that is to be output from the battery to supply a part of the power output from the engine through the drive motor that operates as an electric generator.

Another exemplary embodiment of the present invention provides a method of controlling a hybrid vehicle including: a drive motor and an engine configured to generate power necessary for traveling of a vehicle; and multiple electric superchargers installed in multiple intake lines through which outside air to be supplied into a combustion chamber of the engine flows, the method may include: determining, by a controller, required power of a driver based on an engagement degree of an accelerator pedal; and determining, by the controller, an operation mode of the multiple electric superchargers based on the required power and a state of charge (SOC) of a battery and adjusting the power output from the engine and the power output from the drive motor.

The required power may be determined based on an engagement degree of an accelerator pedal position sensor (APS) mounted within a vehicle and divided into a highest load state, a high load state, a middle load state, and a low load state. When the required power is in the highest load state and the SOC of the battery is a preset value or greater, the method may include: operating the engine to output maximum power; determining the operation mode of the multiple electric superchargers so that the engine outputs the maximum power; outputting the remaining power except for the maximum power from the engine from traveling power of a vehicle determined based on the required power through the drive motor; supplying the drive motor with the remaining power except for a sum of power generated by adding up supercharger power required for the electric superchargers, electrical component power required for electrical components, and air conditioner power required for an air conditioner from the power that is to be output from the battery; and outputting the traveling power generated by adding up drive motor power output from the drive motor and the maximum power from the engine.

When the required power is in the highest load state and the SOC of the battery is less than a preset value, the method may include: operating the engine to output maximum power; determining the operation mode of the multiple electric superchargers so that the engine outputs the maximum power; and controlling a sum of power generated by adding up supercharger power required for the electric superchargers, electrical component power required for electrical components, and air conditioner power required for an air conditioner to supply a part of the power output from the engine through the drive motor that operates as an electric generator.

When the required power is in the high load state and the SOC of the battery is a preset value or greater, the method may include: operating the engine to output maximum power; determining the operation mode of the multiple electric superchargers so that the engine outputs the maximum power; outputting the remaining power except for the maximum power from the engine from traveling power determined based on the required power through the drive motor; supplying the drive motor with the remaining power except for a sum of power generated by adding up supercharger power required for the electric superchargers, electrical component power required for electrical components, and air conditioner power required for an air conditioner from the power that is to be output from the battery; and outputting the traveling power generated by adding up drive motor power output from the drive motor and the maximum power from the engine.

When the required power is in the high load state and the SOC of the battery is less than a preset value, the method may include: operating the engine to output maximum power; determining the operation mode of the multiple electric superchargers so that the engine outputs the maximum power; and controlling a sum of power generated by adding up supercharger power required for the electric superchargers, electrical component power required for electrical components, and air conditioner power required for an air conditioner to supply a part of the power output from the engine through the drive motor that operates as an electric generator.

When the required power is in the middle load state and the SOC of the battery is a preset value or greater, the method may include: operating the engine to output optimum power; determining the operation mode of the multiple electric superchargers so that the engine outputs the optimum power; outputting the remaining power except for the optimum power from the engine from traveling power determined based on the required power through the drive motor; supplying the drive motor with the remaining power except for a sum of power generated by adding up supercharger power required for the electric superchargers, electrical component power required for electrical components, and air conditioner power required for an air conditioner from the power that is to be output from the battery; and outputting the traveling power generated by adding up drive motor power output from the drive motor and the optimum power from the engine.

When the required power is in the middle load state and the SOC of the battery is less than a preset value, the method may include: operating the engine to output optimum power; determining the operation mode of the multiple electric superchargers so that the engine outputs the optimum power; and controlling charging power for charging the battery and a sum of power generated by adding up supercharger power required for the electric superchargers, electrical component power required for electrical components, and air conditioner power required for an air conditioner to supply a part of the power output from the engine through the drive motor that operates as an electric generator.

When the required power is in the low load state and the SOC of the battery is a preset value or greater, the method may include: operating the engine to output optimum power; stopping operations of the multiple electric superchargers; outputting the remaining power except for the optimum power from the engine from traveling power determined based on the required power through the drive motor; supplying the drive motor with the remaining power except for a sum of power generated by adding up supercharger power required for the electric superchargers, electrical component power required for electrical components, and air conditioner power required for an air conditioner from the power that is to be output from the battery; and outputting the traveling power generated by adding up drive motor power output from the drive motor and the optimum power from the engine.

When the required power is in the low load state and the SOC of the battery is less than a preset value, the method may include: operating the engine to output optimum power; stopping operations of the multiple electric superchargers; and controlling charging power for charging the battery and a sum of power generated by adding up electrical component power required for electrical components and air conditioner power required for an air conditioner from the power that is to be output from the battery to supply a part of the power output from the engine through the drive motor that operates as an electric generator.

According to the apparatus and the method for controlling a hybrid vehicle having electric superchargers according to the exemplary embodiment of the present invention, it may be possible to improve fuel economy of the vehicle in the traveling situation under the high load condition by controlling the method of distributing power to the engine and the drive motor based on the SOC of the battery. In addition, it may be possible to improve the traveling performance of the vehicle since the electric superchargers may prevent the SOC of the battery from being additionally decreased when the vehicle travels only using the output from the engine in the situation in which the SOC of the battery is low.

In comparison with the case in which a naturally aspirated (NA) engine is applied to a hybrid vehicle, the decrease in SOC may be prevented, and as a result, it may be possible to reduce manufacturing costs of the vehicle by reducing the capacity of the battery. In addition, in comparison with the case in which a naturally aspirated (NA) engine is applied to a hybrid vehicle, it may be possible to prevent the engine from being used in a high-RPM region, and as a result, it may be possible to inhibit noise and vibration generated in the vehicle.

BRIEF DESCRIPTION OF THE DRAWINGS

Since the drawings are provided for reference to describe exemplary embodiments of the present invention, the technical spirit of the present invention should not be construed as being limited to the accompanying drawings.

DETAILED DESCRIPTION

Figure 1:
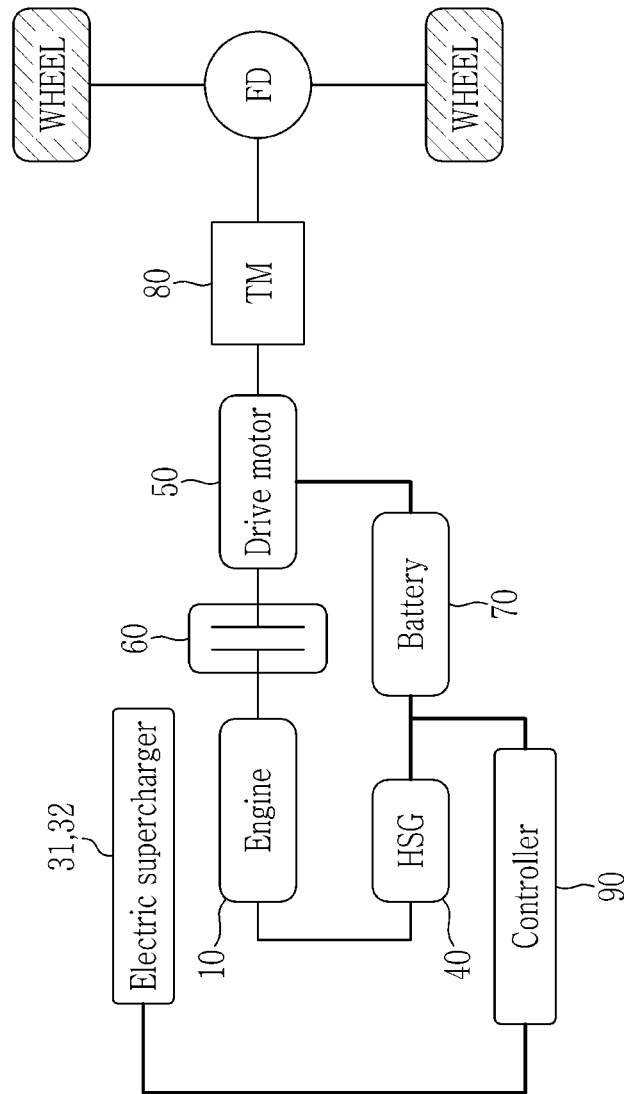
FIG. 1 is a conceptual view illustrating a configuration of an apparatus for controlling a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "part" in referring to some herein will be understood as meaning a portion of a total amount.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

The drawings and description are to be regarded as illustrative in nature and not restrictive. Like reference numerals designate like elements throughout the specification. In addition, the size and thickness of each component illustrated in the drawings are arbitrarily shown for ease of description, but the present invention is not limited thereto. In order to clearly describe several portions and regions, thicknesses thereof are enlarged.

Hereinafter, an apparatus for controlling a hybrid vehicle according to an exemplary embodiment of the present invention will be described in detail with reference to the accompanying drawings.

Figure 2:
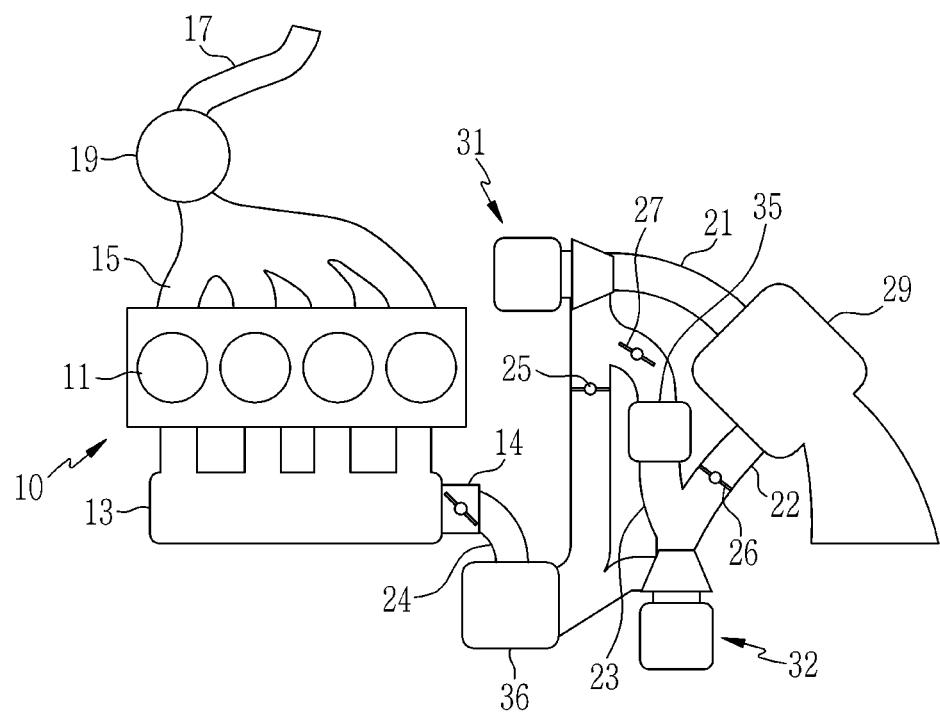
FIG. 2 is a conceptual view illustrating a relationship between an engine and electric superchargers of a hybrid vehicle according to the exemplary embodiment of the present invention.

FIG. 1 is a conceptual view illustrating a configuration of an apparatus for controlling a hybrid vehicle according to an exemplary embodiment of the present invention. FIG. 2 is a conceptual view illustrating a relationship between an engine and electric superchargers of a hybrid vehicle according to the exemplary embodiment of the present invention. Further, FIG. 3 is a block diagram illustrating the configuration of the apparatus for controlling a hybrid vehicle according to the exemplary embodiment of the present invention.

A structure of a transmission mounted electric device (TMED) type will be described as an example in respect to a hybrid vehicle according to an exemplary embodiment of the present invention which will be described below. However, the scope of the present invention is not limited thereto, and the present invention may of course be applied to other types of hybrid electricity vehicles.

Figure 3:
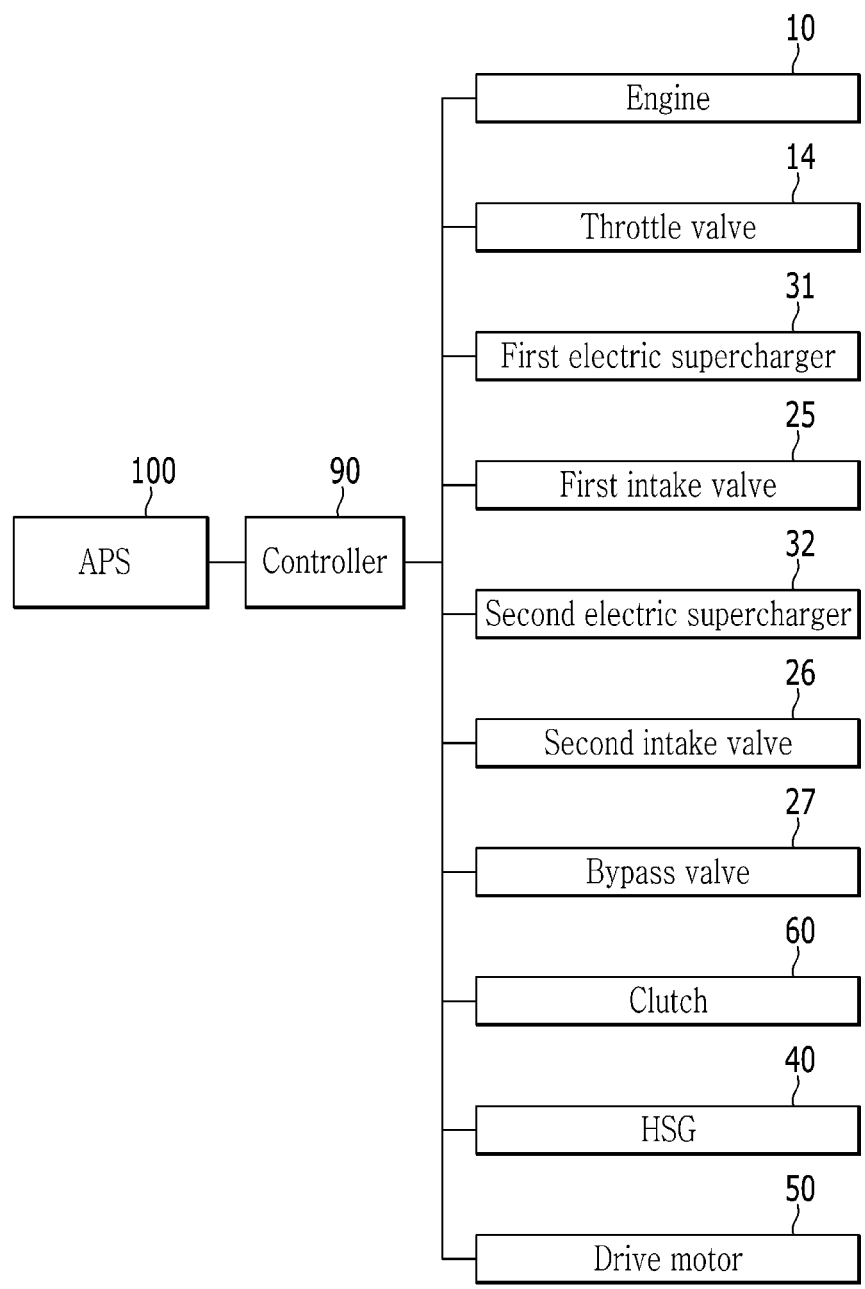
FIG. 3 is a block diagram illustrating the configuration of the apparatus for controlling a hybrid vehicle according to the exemplary embodiment of the present invention.

As illustrated in FIGS. 1 to 3, the hybrid vehicle to which the apparatus for controlling a hybrid vehicle according to the exemplary embodiment of the present invention is applied may include an engine 10, a hybrid starter generator (HSG) 40, a drive motor 50, a clutch 60, a battery 70, an accelerator pedal sensor, and a controller 90. The engine 10 generates power by combusting fuel.

Referring to FIG. 2, intake air to be supplied into a combustion chamber 11 of the engine 10 may be supplied through multiple intake lines, and exhaust gas discharged from the combustion chamber 11 of the engine 10 may be discharged to the outside through an exhaust manifold 15 and an exhaust line 17. In particular, a catalyst converter 19 configured to purify the exhaust gas may be installed in the exhaust line 17.

The multiple intake lines may include a first intake line 21 through which outside air to be supplied into the combustion chamber 11 may flow, and a second intake line 22 through which outside air to be supplied into the combustion chamber 11 may flow. However, the scope of the present invention is not limited thereto. A connection line 23 that connects the first intake line 21 and the second intake line 22 may be installed between the first intake line 21 and the second intake line 22. In other words, the connection line 23 may diverge from the first intake line 21 and merge into the second intake line 22.

Each of the electric superchargers installed in the first intake line 21 and the second intake line 22 may be configured to supply supercharged air into the combustion chamber 11 and may include a motor and an electric compressor. The electric compressor may be operated by the motor, may be configured to compress outside air under an operating condition, and may be configured to supply the compressed air into the combustion chamber 11. A first intake valve 25 may be installed in the first intake line 21. Specifically, the first intake valve 25 may be installed downstream from the first electric supercharger 31 installed in the first intake line 21. The amount of intake air to be supplied through the first intake line 21 may be adjusted based on an opening degree of the first intake valve 25.

A second intake valve 26 may be installed in the second intake line 22. Specifically, the second intake valve 26 may be installed downstream from the second electric supercharger 32 installed in the second intake line 22. The amount of intake air to be supplied through the second intake line 22 may be adjusted based on an opening degree of the second intake valve 26. The first intake line 21 and the second intake line 22 merge into a main intake line 24, and a main intercooler 36 may be installed in the main intake line 24. The air compressed by the electric supercharger may be cooled by the main intercooler 36.

A bypass valve 27 may be installed in the connection line 23. Particularly, an auxiliary intercooler 35 may be installed in the connection line 23. The air compressed by the first electric supercharger 31 may be cooled by the auxiliary intercooler 35. An air cleaner 29 configured to filter outside air introduced from the outside may be mounted at an inlet of the first intake line 21 and an inlet of the second intake line 22. The intake air introduced through the first intake line 21 and the second intake line 22 may be supplied into the combustion chamber 11 through the intake manifold 13. A throttle valve 14 may be mounted in the intake manifold 13 and may be configured to adjust the amount of air to be supplied into the combustion chamber 11.

In the exemplary embodiment of the present invention, the two electric superchargers may operate in three operation modes. The three operation modes may include a single mode, a series mode, and a parallel mode. The single mode refers to a mode in which only one electric supercharger operates to supply the supercharged air into the combustion chamber 11 of the engine 10. In particular, in the single mode, only one of the two electric superchargers (e.g., the first electric supercharger 31) operates, and the other of the two electric superchargers (e.g., the second electric supercharger 32) does not operate. In this case, the second intake valve 26 and the bypass valve 27 may be closed, and the amount of supercharged air to be supplied into the combustion chamber 11 may be determined based on an opening degree of the first intake valve 25 and a rotational speed of the first electric supercharger 31. The electric superchargers may be configured to operate in the single mode in a low load region.

The series mode refers to a mode in which the supercharged air is supplied into the combustion chamber 11 of the engine 10 by the two electric superchargers. In this case, both of the first intake valve 25 and the second intake valve 26 may be closed, and the amount of supercharged air to be supplied into the combustion chamber 11 may be adjusted by adjusting an opening degree of the bypass valve 27. Further, the controller 90 may be configured to operate the first electric supercharger 31 and the second electric supercharger 32 to supply the combustion chamber 11 with the air supercharged by the first electric supercharger 31 and the second electric supercharger 32. In other words, the outside air introduced into the first intake line may be primarily boosted by the first electric supercharger 31 and introduced into the second intake line 22 via the connection line 23. Further, the air may be additionally boosted by the second electric supercharger 32.

The electric superchargers may be configured to operate in the series mode in a low or middle speed/high load region. Since a high compression ratio is required in the low or middle speed/high load region, it may be possible to increase a compression ratio of the outside air to be supplied into the combustion chamber 11 by operating the first electric supercharger 31 and the second electric supercharger 32 in series.

The parallel mode refers to a mode in which the air supercharged by the two electric superchargers is supplied into the combustion chamber 11 of the engine 10. In this case, the controller 90 may be configured to operate and close the bypass valve 27 and adjust the opening degree of the first intake valve 25 and the opening degree of the second intake valve 26 to thus adjust the amount of supercharged air to be supplied into the combustion chamber 11. Further, the controller 90 may be configured to operate the first electric supercharger 31 and the second electric supercharger 32 to supply the combustion chamber 11 with the air supercharged by the first electric supercharger 31 and the second electric supercharger 32.

The electric superchargers may be configured to operate in the parallel mode in a high speed/high load region. Since a substantial amount of outside air is required in the high speed/high load region, the intake air may be supplied into the combustion chamber 11 through the first intake line 21 and the second intake line 22. In other words, since the first electric supercharger 31 and the second electric supercharger 32 operate in parallel, a substantial amount of intake air may be supplied into the combustion chamber 11.

Referring back to FIG. 1, the HSG 40 may be configured to start the engine 10 and operate selectively as an electric generator when the engine 10 is started, thereby producing electrical energy. The drive motor 50 supplements power from the engine 10 and may be configured to operate selectively as an electric generator to produce electrical energy. The drive motor 50 may be configured to operate using electrical energy stored in the battery 70, and the battery 70 may be charged with the electrical energy produced by the drive motor 50 and the HSG 40.

Figure 4:
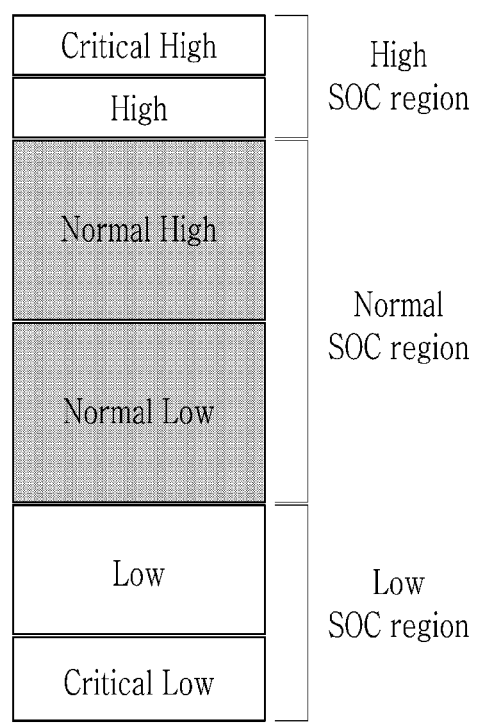
FIG. 4 is a view illustrating an SOC region of a battery according to the exemplary embodiment of the present invention.

The hybrid vehicle according to the exemplary embodiment of the present invention distributes the power from the engine 10 and the power from the drive motor 50 to the state of charge (SOC) region of the battery 70. In the exemplary embodiment of the present invention, the SOC of the battery 70 may be divided into three regions. Referring to FIG. 4, the SOC region of the battery 70 may be divided into a high region, a middle region, and a low region. Further, the high region may be divided into a critical high (CH) region and a high (H) region, the middle region may be divided into a normal high (NH) region and a normal low (NL) region, and the low region may be divided into a low (L) region and a critical low (CL) region.

Furthermore, the accelerator pedal sensor may be configured to detect an operation of an accelerator pedal. The amount of change in the accelerator pedal (e.g., engagement amount) detected by the accelerator pedal sensor may be transmitted to the controller 90. The controller 90 may then be configured to determine required power based on acceleration intention of a driver (e.g., the engagement degree) based on the amount of change in accelerator pedal detected by the accelerator pedal sensor. The operation mode may be selectively switched from an EV mode to an HEV mode.

The controller 90 may be configured to operate constituent elements of the vehicle including the engine 10, the HSG 40, the drive motor 50, the electric superchargers, the battery 70, and the clutch 60. The controller 90 may include one or more processors configured to be operated by a preset program, and the preset program performs respective steps of a method of controlling a hybrid vehicle according to the exemplary embodiment of the present invention.

Particularly, the clutch 60 may be disposed between the engine 10 and the drive motor 50, and the hybrid vehicle may be driven in the electric vehicle (EV) mode or the hybrid electric vehicle (HEV) mode based on whether the clutch 60 is engaged. The EV mode refers to a mode in which the vehicle travels using driving power from the motor, and the HEV mode refers to a mode in which the vehicle travels using driving power from the motor and the engine 10.

The driving power output from the engine 10 and the drive motor 50 may be transmitted to drive wheels of the vehicle. In addition, a transmission 80 may be disposed between the clutch 60 and the drive wheels. Shift gears may be installed in the transmission 80, and the power output from the engine 10 and the drive motor 50 may vary based on the stages of the shift gears.

Hereinafter, the method of controlling a hybrid vehicle according to the exemplary embodiment of the present invention will be described in detail with reference to the accompanying drawings. First, the controller 90 may be configured to determine the acceleration intention of the driver or the required power of the driver based on an engagement degree of the accelerator pedal. The required power of the driver according to the pushing or engagement degree of the accelerator pedal may be divided into a highest load state, a high load state, a middle load state, and a low load state.

For example, the required power may be in the highest load state when the engagement degree of the accelerator pedal is 100%. The required power may be in the high load state when the engagement degree of the accelerator pedal is less than 100% and equal to or greater than 60%. The required power may be in the middle load state when the engagement degree of the accelerator pedal is less than 60% or equal to or greater than 30%. The required power may be in the low load state when the engagement degree of the accelerator pedal is less the 30% or greater than 0%. In addition, the vehicle may be determined to be in a coasting state when the engagement degree of the accelerator pedal is 0% and an engagement degree of a brake pedal is 0%, and the vehicle may be determined to be in a braking state when the engagement degree of the accelerator pedal is 0% and the brake pedal is in an engaged state.

The controller 90 may be configured to calculate a traveling load of a vehicle according to the required power of the driver based on the engagement degree of the accelerator pedal. The traveling load of the vehicle may be calculated based on the required power of the driver, a current vehicle speed, a gradient of a vehicle body, or the like. When the required power of the driver is in the highest load state (e.g., wide open throttle (WOT)) and the SOC of the battery 70 is a preset value or greater (e.g., an entire region except for the low SOC region in the exemplary embodiment of the present invention), the controller 90 may be configured to calculate traveling power necessary for the traveling of the vehicle based on the required power of the driver. Further, the controller 90 may be configured to operate the engine 10 to output maximum power and determine the operation mode of the electric superchargers.

When the SOC is a preset value or greater in the highest load state (i.e., a situation in which the SOC has a margin), the operation mode of the electric superchargers may be determined as follows. First, the controller 90 may be configured to determine pressure (e.g., boost pressure) of air and the amount of air to be supplied to the engine 10 based on a speed (e.g., revolutions per minute RPM) of the engine 10 and required torque of the driver, and determine the operation mode (e.g., series mode) of the electric superchargers based on the determined amount of air and the determined pressure of air. In particular, the controller 90 may be configured to determine the operation mode of the electric superchargers by determining an operation point of the electric superchargers at which the multiple electric superchargers have highest efficiency. For example, in a situation in which the required power of the driver is in the highest load state and the SOC has a margin, the electric superchargers may be configured to operate in the series mode.

In the highest load state, the remaining power except for the maximum power of the engine 10 from the traveling power of the vehicle may be output from the drive motor 50. Accordingly, the controller 90 may be configured to calculate a sum of power generated by adding up supercharger power required for the electric superchargers, electrical component power required for the electrical components, and air conditioner power required for an air conditioner, and operate the drive motor 50 to output power except for the power from the engine 10 from the traveling power by supplying the drive motor 50 with the remaining power except for the sum of power from the power that may be output from the battery 70.

Figure 5:
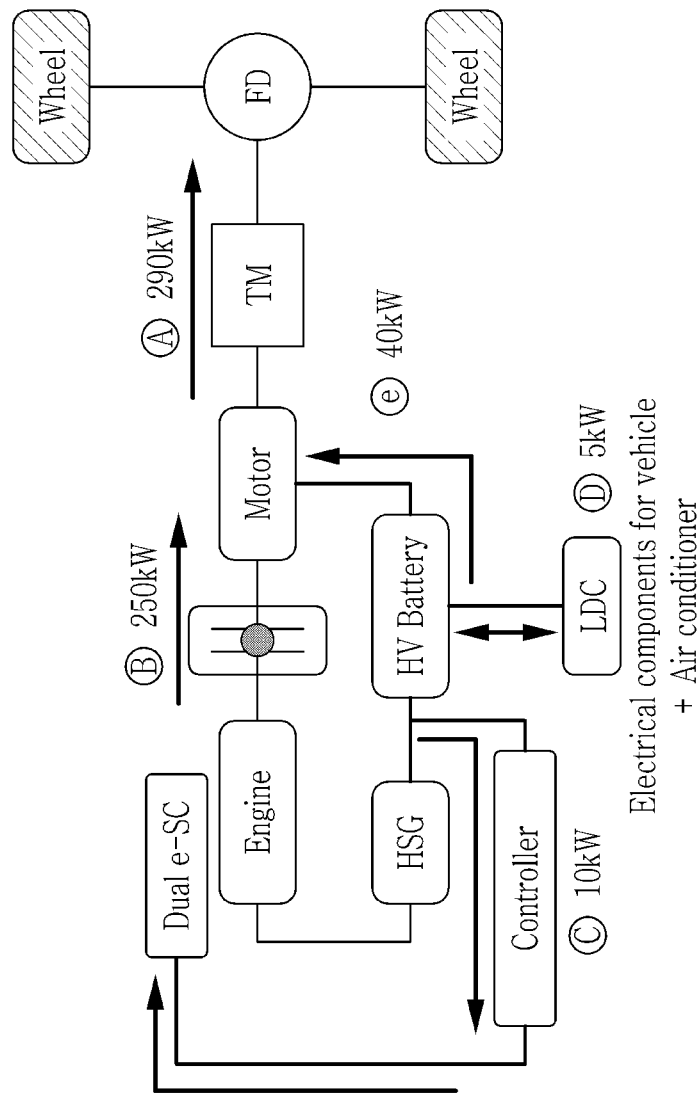
FIGS. 5 to 8 are views illustrating a process of distributing power to the engine and a drive motor in a highest load state.

For example, referring to FIG. 5, when the traveling power of the vehicle is about 290 kW, the controller 90 may be configured to determine the operation mode of the electric superchargers so that the engine 10 outputs the maximum power of about 250 kW. The operation mode of the electric superchargers may be determined as described above. In particular, when the supercharger power required for the electric superchargers is about 10 kW and the electrical component power required for the electrical components and the air conditioner power required for the air conditioner are about 5 kW, the controller 90 may be configured to adjust (e.g., control) the sum of power so that the sum of power of about 15 kW is supplied to the electric superchargers, the electrical components, and the air conditioner from the battery 70, and the controller 90 may be configured to operate the drive motor 50 to output the remaining power of about 40 kW except for the maximum power of about 250 kW from the engine 10 from the traveling power of about 290 kW.

When the required power of the driver is in the highest load state (e.g., wide open throttle (WOT)) and the SOC of the battery 70 is less than the preset value (e.g., the SOC is in the low region in the exemplary embodiment of the present invention), the controller 90 may be configured to calculate the traveling power necessary for the traveling of the vehicle based on the required power of the driver. Further, the controller 90 may be configured to operate the engine 10 to output maximum power and determine the operation mode of the electric superchargers.

When the SOC is less than the preset value in the highest load state (i.e., a situation in which the SOC has no margin), the operation mode of the electric superchargers may be determined as follows. First, the controller 90 may be configured to determine the pressure (e.g., boost pressure) of air and the amount of air to be supplied to the engine 10 based on the speed (RPM) of the engine 10 and the required torque of the driver, and determine the operation mode (e.g., series mode) of the electric superchargers based on the determined amount of air and the determined pressure of air. In particular, the controller 90 may be configured to determine the operation mode of the electric superchargers by determining the operation point of the electric superchargers at which the multiple electric superchargers have highest efficiency. For example, in the situation in which the required power of the driver is in the highest load state and the SOC has a margin, the electric superchargers may be configured to operate in the series mode.

The controller 90 may be configured to calculate the sum of power generated by adding up the supercharger power required for the electric superchargers, the electrical component power required for the electrical component, and the air conditioner power required for the air conditioner. In particular, since the SOC is low, the sum of power necessary for the operations of the electric superchargers, the electrical components, and the air conditioner uses a part of the power output from the engine 10. In other words, the controller 90 may be configured to operate the drive motor 50 as an electric generator, thereby producing the sum of power using a part of the maximum power output from the engine 10.

Figure 6:
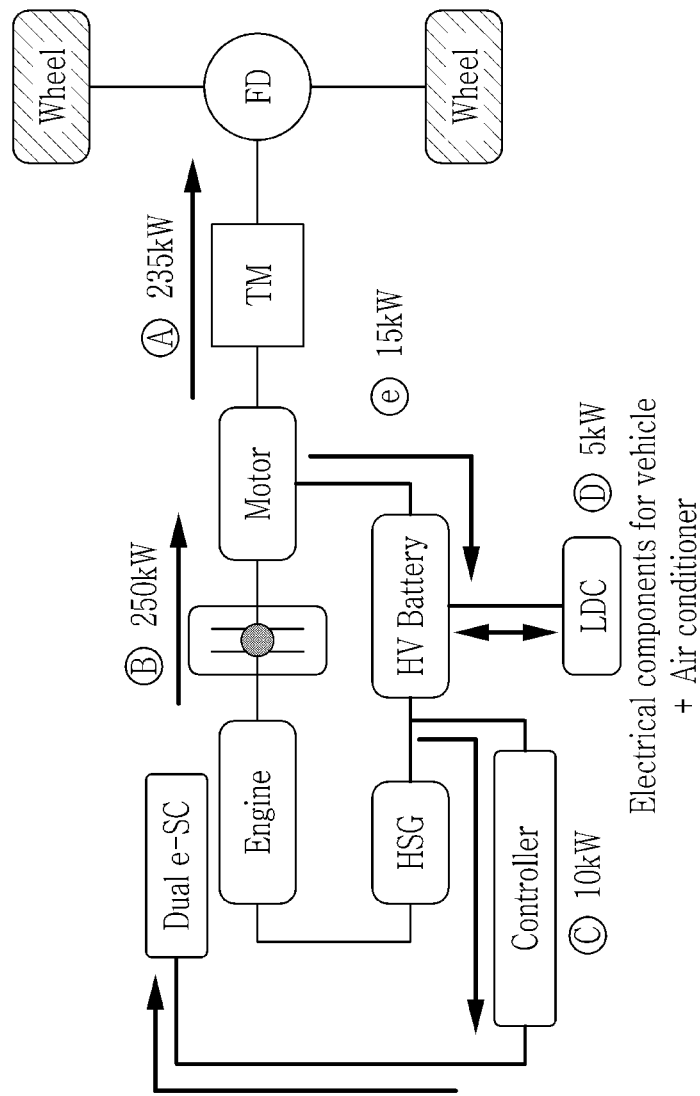

Therefore, the power except for the sum of power from the maximum power from the engine 10 may be output as the traveling power of the vehicle. For example, referring to FIG. 6, when the maximum power output from the engine 10 is about 250 kW, the controller 90 may be configured to determine the operation mode of the electric superchargers so that the engine 10 outputs the maximum power of about 250 kW. The operation mode of the electric superchargers may be determined as described above. In particular, when the supercharger power required for the electric supercharger is about 10 kW and the electrical component power required for the electrical components and the air conditioner power required for the air conditioner are about 5 kW, the controller 90 may be configured to operate the drive motor 50 as an electric generator to generate electric power of about 15 kW from the maximum power outputted from the engine 10, and supply the electric power to the electric superchargers, the electrical components, and the air conditioner. Further, the power of about 235 kW except for the sum of power of about 15 kW from the maximum power of about 250 kW from the engine 10 may be output as the traveling power.

As described above, when the SOC of the battery 70 is in the low region in the highest load state, a part of the maximum power from the engine 10 may be used as electric power required to operate the electric superchargers, the electrical components, and the air conditioner, thereby preventing the SOC of the battery 70 from entering the critical low (CL) region.

When the required power of the driver is in the highest load state (e.g., wide open throttle (WOT)) and the SOC of the battery 70 is less than the preset value (e.g., the SOC is in the critical low region in the exemplary embodiment of the present invention), the controller 90 may be configured to calculate the traveling power necessary for the traveling of the vehicle based on the required power of the driver. Further, the controller 90 may be configured to operate the engine 10 to output the maximum power and stop operation the electric superchargers at the initial time.

Additionally, the controller 90 may be configured to generate electric power through the HSG 40 using a part of the power outputted from the engine 10 and charge the battery 70 with the electric power. The controller 90 may be configured to calculate the sum of power generated by adding up the electrical component power required for the electrical components and the air conditioner power required for the air conditioner. In particular, since the SOC is very low, the electric power of the battery 70 is not supplied directly to the electric supercharger at the initial of the traveling, and only the electric power required for the electrical components and the air conditioner is supplied.

However, the battery 70 may be charged with a part of the power output from the engine 10, a part of the electric power stored in the battery 70 may be supplied to the electrical components and the air conditioner, and the remaining electric power may be supplied to the electric superchargers. Since a part of the electric power may be supplied to the electric supercharger, the power output from the engine 10 gradually increases, and the SOC of the battery 70 gradually increases, and thus, the electric power, which may be supplied to the electric superchargers, gradually increases.

Therefore, the battery 70 may be charged with a part of the maximum power from the engine 10 by the HSG 40, a part of the sum of power of the electric power stored in the battery 70 may be supplied to the electrical components and the air conditioner, and the remaining power may be supplied to the electric superchargers. In particular, since the SOC of the battery 70 is very low, the electric superchargers may be configured to operate in the single mode.

Figure 7:
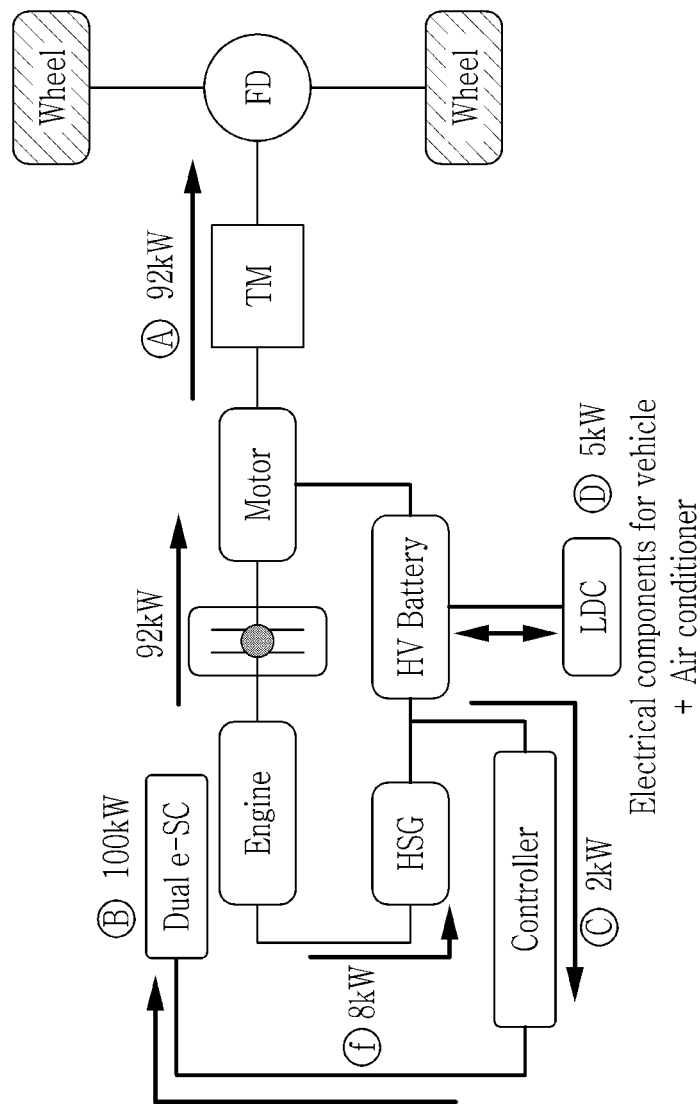

For example, referring to FIG. 7, when the maximum power output from the engine 10 is about 100 kW when the electric supercharger operations are stopped, the controller 90 may be configured to operate the HSG 40 to charge the battery 70 with a part of the power (e.g., about 8 kW) output from the engine 10. In particular, when the sum of power required for the electrical components and the air conditioner is about 5 kW, the controller 90 may be configured to supply the electrical components and the air conditioner with the power of about 5 kW from the power of about 8 kW stored in the battery 70 by the HSG 40, and supply the electric superchargers with the remaining power of about 2 kW. Further, the power of about 92 kW except for the power of about 8 kW generated by the HSG 40 from the maximum power of about 100 kW from the engine 10 may be output as the traveling power.

As described above, when the SOC of the battery 70 is in the critical low state in the highest load state, the HSG 40 may be configured to generate electric power using a part of the maximum power output from the engine 10 and charge the battery 70 with the electric power, and a part of the power stored in the battery 70 may be supplied to the electrical components, the air conditioner, and the electric superchargers, to thus gradually increase the output of the engine 10 generated by the electric superchargers.

When the vehicle begins to gradually travel, the power to be supplied to the electric superchargers may be gradually increased, and thus, the maximum power, which may be output from the engine 10, may gradually increase. Therefore, as the charging power with which the battery 70 may be charged gradually increases, the SOC of the battery 70 may be increased by the drive motor 50.

Figure 8:
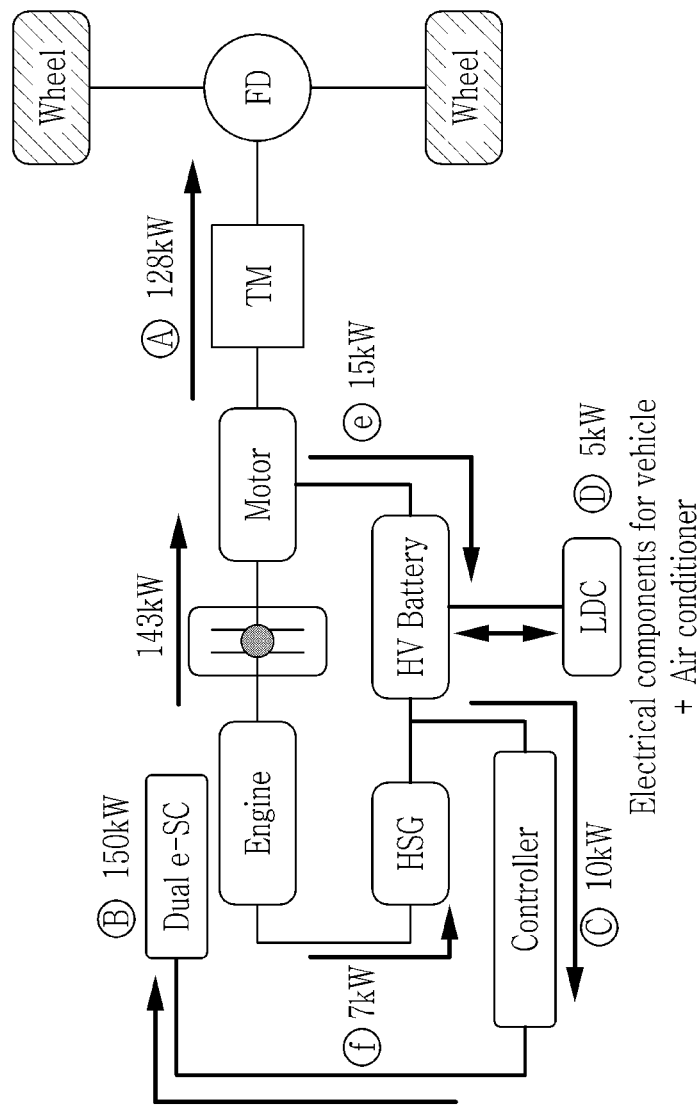

For example, referring to FIG. 8, when the maximum power output from the engine 10 by the operations of the electric superchargers (e.g., the operations in the single mode) is about 150 kW, the controller 90 may be configured to operate the HSG 40 to charge the battery 70 with a part of the power (e.g., about 7 kW) output from the engine 10. Further, the battery 70 may be charged, by the drive motor 50, with a part of the power (e.g., about 15 kW) output from the engine 10. In particular, when the sum of power required for the electrical components and the air conditioner is about 5 kW, the controller 90 may be configured to supply the electrical components and the air conditioner with the power of about 5 kW from the power of about 22 kW supplied from the HSG 40 and the drive motor 50, and supply the electric superchargers with the remaining power of about 10 kW. In addition, the power of about 128 kW except for the power of about 22 kW supplied from the HSG 40 and the drive motor 50 from the maximum power of about 150 kW from the engine 10 may be output as the traveling power.

As described above, when the vehicle travels for a predetermined period of time with the SOC of the battery 70 in the critical low region or a temperature of the battery 70 extremely high or low when the required power of the driver is in the highest load state, the battery 70 may be charged with a part of the maximum power outputted from the engine 10 by the HSG 40 and the drive motor 50, and a part of the power stored in the battery 70 may be supplied to the electrical components, the air conditioner, and the electric superchargers, and thus, the output of the engine 10 generated by the electric superchargers may gradually increase, and the SOC of the battery 70 may increase.

When the SOC of the battery 70 deviates from the critical low region, the electric superchargers may be configured to operate in accordance with the above-mentioned situation in which the SOC of the battery 70 is in the low region or in a region equal to or greater than the low region in the highest load state. When the required power of the driver is in the high load state (high tip-in (HTI)) and the SOC of the battery 70 is the preset value or greater, the controller 90 may be configured to calculate the traveling power required for the traveling of the vehicle based on the required power of the driver. Further, the controller 90 may be configured to operate the engine 10 to output the maximum power and determine the operation mode of the electric superchargers. The electric superchargers may be configured to operate in the series mode in the highest load state.

In the high load state, the remaining power except for the maximum power from the engine 10 from the traveling power of the vehicle may be output by the drive motor 50. Accordingly, the controller 90 may be configured to calculate the sum of power generated by adding up the supercharger power required for the electric superchargers, the electrical component power required for the electrical components, and the air conditioner power required for the air conditioner, and operate the drive motor 50 to output the power except for the power from the engine 10 from the traveling power by supplying the drive motor 50 with the remaining power except for the sum of power from the power that may be output from the battery 70.

Figure 9:
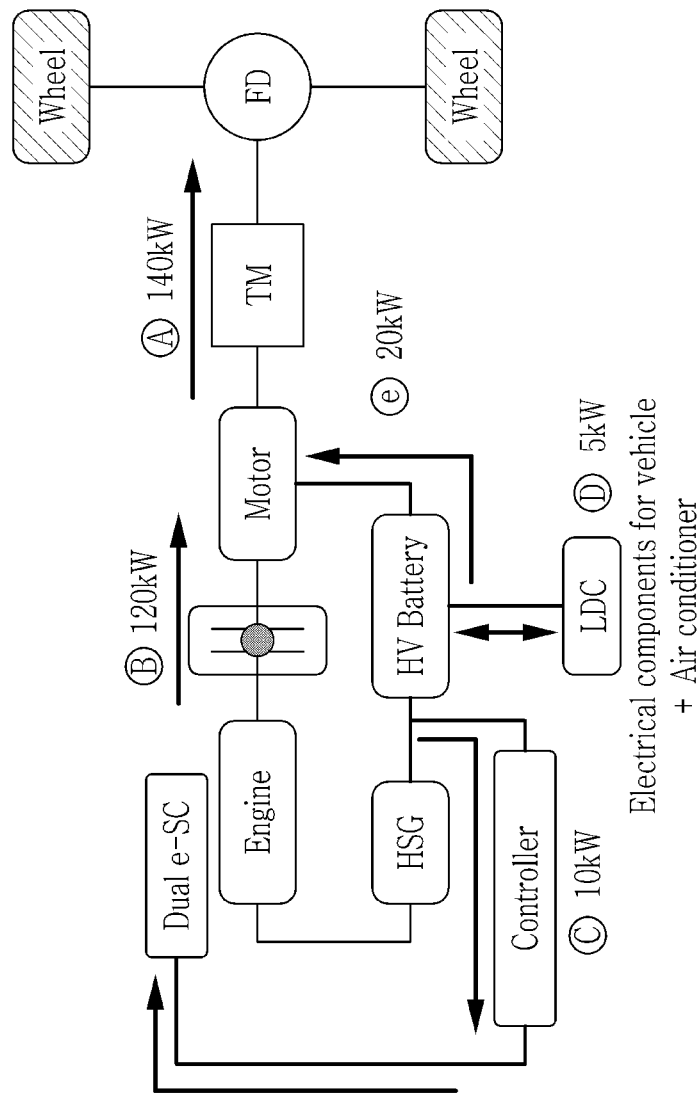
FIGS. 9 and 10 are views illustrating a process of distributing power to the engine and the drive motor in a high load state according to the exemplary embodiment of the present invention.

For example, referring to FIG. 9, when the traveling power of the vehicle is about 140 kW, the controller 90 may be configured to determine the operation mode of the electric superchargers so that the engine 10 outputs the maximum power of about 140 kW. In particular, when the supercharger power required for the electric superchargers is about 10 kW and the electrical component power required for the electrical components and the air conditioner power required for the air conditioner are about 5 kW, the controller 90 may be configured to adjust the sum of power so that the sum of power of about 15 kW is supplied to the electric superchargers, the electrical components, and the air conditioner from the battery 70, and the controller 90 may be configured to operate the drive motor 50 to output the remaining power of about 20 kW except for the maximum power of about 120 kW from the engine 10 from the traveling power of about 140 kW.

When the required power of the driver is in the high load state (high tip-in (HTI)) and the SOC of the battery 70 is less than the preset value (e.g., the SOC is in the low region in the exemplary embodiment of the present invention), the controller 90 may be configured to calculate the traveling power required for the traveling of the vehicle based on the required power of the driver. Further, the controller 90 may be configured to operate the engine 10 to output the maximum power and determine the operation mode of the electric superchargers. The electric superchargers may be configured to operate in the series mode in the highest load state.

Additionally, the controller 90 may be configured to calculate the sum of power generated by adding up the supercharger power required for the electric superchargers, the electrical component power required for the electrical component, and the air conditioner power required for the air conditioner. In particular, since the SOC is low, the sum of power necessary for the operations of the electric superchargers, the electrical components, and the air conditioner uses a part of the power output from the engine 10. In other words, the controller 90 may be configured to operate the drive motor 50 as an electric generator, thereby producing the sum of power using a part of the maximum power output from the engine 10. Therefore, the power except for the sum of power from the maximum power from the engine 10 may be output as the traveling power of the vehicle.

Figure 10:
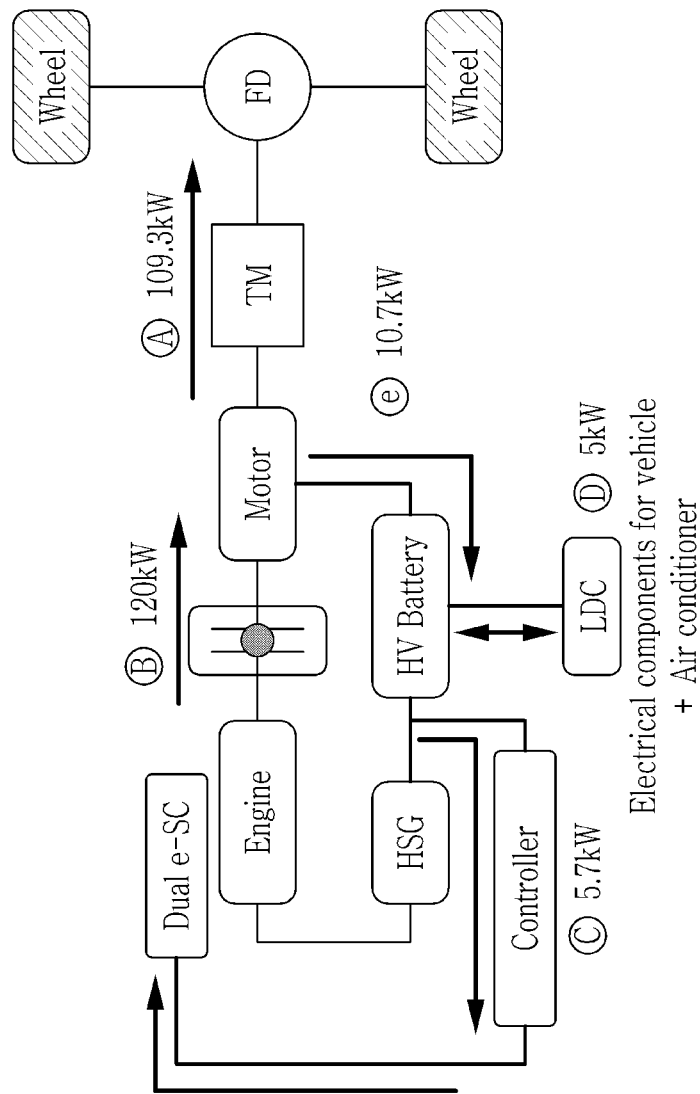

For example, referring to FIG. 10, when the maximum power output from the engine 10 is about 120 kW, the controller 90 may be configured to determine the operation mode of the electric superchargers so that the engine 10 outputs the maximum power of about 120 kW. In particular, when the supercharger power required for the electric supercharger is about 5.7 kW and the electrical component power required for the electrical components and the air conditioner power required for the air conditioner are about 5 kW, the controller 90 may be configured to operate the drive motor 50 as an electric generator to generate electric power of about 10.7 kW from the maximum power outputted from the engine 10, and supply the electric power to the electric superchargers, the electrical components, and the air conditioner. Further, the power of about 109.3 kW except for the sum of power of about 10.7 kW from the maximum power of about 120 kW from the engine 10 may be output as the traveling power.

As described above, when the SOC of the battery 70 is in the low region in the highest load state, a part of the maximum power from the engine 10 may be used as electric power required to operate the electric superchargers, the electrical components, and the air conditioner, thereby preventing the SOC of the battery 70 from entering the critical low (CL) region. When the required power of the driver is in the middle load state (e.g., middle tip-in (MTI)) and the SOC of the battery 70 is the preset value or greater, the controller 90 may be configured to calculate the traveling power required for the traveling of the vehicle based on the required power of the driver. Further, the controller 90 may be configured to operate the engine 10 to output optimum power so that the engine 10 operates at an optimum efficiency point, and the controller 90 may be configured to determine the operation mode of the electric superchargers. The electric superchargers may be configured to operate in the single mode or the parallel mode in the middle load state.

In the middle load state, the remaining power except for the optimum power from the engine 10 from the traveling power of the vehicle may be output by the drive motor 50. Accordingly, the controller 90 may be configured to calculate the sum of power generated by adding up the supercharger power required for the electric superchargers, the electrical component power required for the electrical components, and the air conditioner power required for the air conditioner, and operate the drive motor 50 to output the power except for the power from the engine 10 from the traveling power by supplying the drive motor 50 with the remaining power except for the sum of power from the power that may be output from the battery 70.

Figure 11:
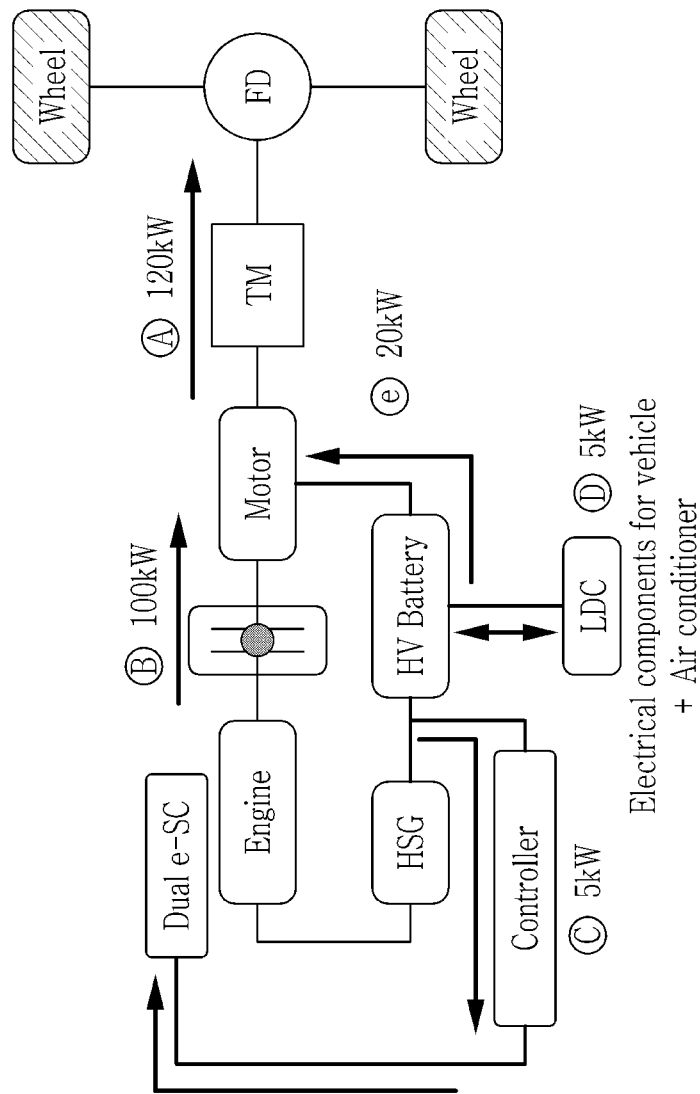
FIGS. 11 and 12 are views illustrating a process of distributing power to the engine and the drive motor in a middle load state according to the exemplary embodiment of the present invention.

For example, referring to FIG. 11, when the traveling power of the vehicle is about 120 kW, the controller 90 may be configured to determine the operation mode of the electric superchargers so that the engine 10 outputs the optimum power of about 100 kW. In particular, when the supercharger power required for the electric superchargers is about 5 kW and the electrical component power required for the electrical components and the air conditioner power required for the air conditioner are about 5 kW, the controller 90 may be configured to adjust the sum of power so that the sum of power of about 10 kW is supplied to the electric superchargers, the electrical components, and the air conditioner from the battery 70, and the controller 90 may be configured to operate the drive motor 50 to output the remaining power of about 20 kW except for the maximum power of about 100 kW from the engine 10 from the traveling power of about 120 kW.

When the required power of the driver is in the middle load state (e.g., middle tip-in (MTI)) and the SOC of the battery 70 is less than the preset value (e.g., the SOC is in the low region in the exemplary embodiment of the present invention), the controller 90 may be configured to calculate the traveling power required for the traveling of the vehicle based on the required power of the driver. Further, the controller 90 may be configured to operate the engine 10 to output the optimum power and determine the operation mode of the electric superchargers. The electric superchargers may be configured to operate in the single mode or the parallel mode in the middle load state.

The controller 90 may be configured to calculate the sum of power generated by adding up the supercharger power required for the electric superchargers, the electrical component power required for the electrical component, and the air conditioner power required for the air conditioner. In particular, since the SOC is low, the sum of power necessary for the operations of the electric superchargers, the electrical components, and the air conditioner uses a part of the power output from the engine 10. In other words, the controller 90 may be configured to operate the drive motor 50 as an electric generator, thereby producing the sum of power and the charging power for charging the battery 70 using a part of the maximum power output from the engine 10. Therefore, the power except for the sum of power and the charging power from the maximum power from the engine 10 may be output as the traveling power of the vehicle.

Figure 12:
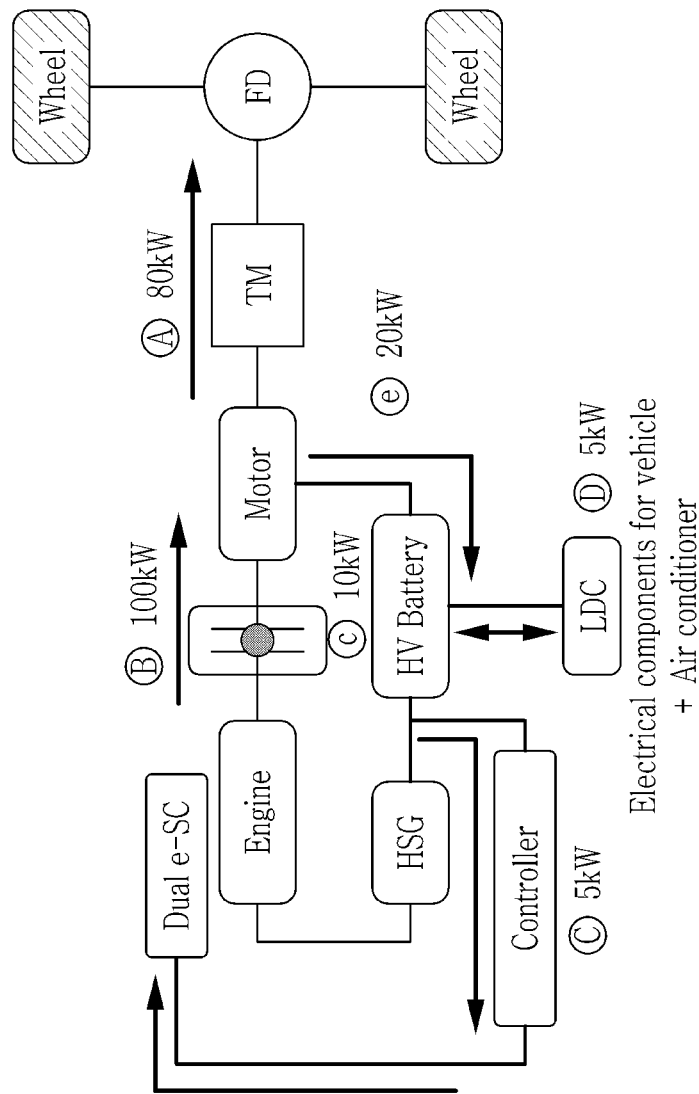

For example, referring to FIG. 12, when the optimum power output from the engine 10 is about 100 kW, the controller 90 may be configured to determine the operation mode of the electric superchargers so that the engine 10 outputs the maximum power of about 100 kW. In particular, when the supercharger power required for the electric supercharger is about 5 kW and the electrical component power required for the electrical components and the air conditioner power required for the air conditioner are about 5 kW, the controller 90 may be configured to operate the drive motor 50 as an electric generator to generate electric power of about 10 kW from the maximum power output from the engine 10, and supply the electric power to the electric superchargers, the electrical components, and the air conditioner. Further, the battery 70 may be charged with the charging power or about 10 kW for charging the battery 70. Therefore, the power of about 80 kW except for the sum of power of about 10 kW and the charging power of about 10 kW from the optimum power of about 100 kW from the engine 10 may be output as the traveling power.

As described above, when the SOC of the battery 70 is in the low region in the middle load state, a part of the maximum power from the engine 10 may be used as electric power required to operate the electric superchargers, the electrical components, and the air conditioner, and a part of the power may be used to charge the battery 70. When the required power of the driver is in the low load state (e.g., low tip-in (LTI)) and the SOC of the battery 70 is the preset value or greater, the controller 90 may be configured to calculate the traveling power required for the traveling of the vehicle (e.g., operation of the vehicle) based on the required power of the driver. Further, the controller 90 may be configured to operate the engine 10 to output the optimum power so that the engine 10 operates at the optimum efficiency point, and the electric superchargers do not operate. In other words, the engine 10 may be configured to operate in the HEV mode.

In the low load state, the remaining power except for the optimum power from the engine 10 from the traveling power of the vehicle may be output by the drive motor 50. Accordingly, the controller 90 may be configured to calculate the sum of power generated by adding up the electrical component power required for the electrical components and the air conditioner power required for the air conditioner, and operate the drive motor 50 to output the power except for the power from the engine 10 from the traveling power by supplying the drive motor 50 with the remaining power except for the sum of power from the power that may be output from the battery 70.

Figure 13:
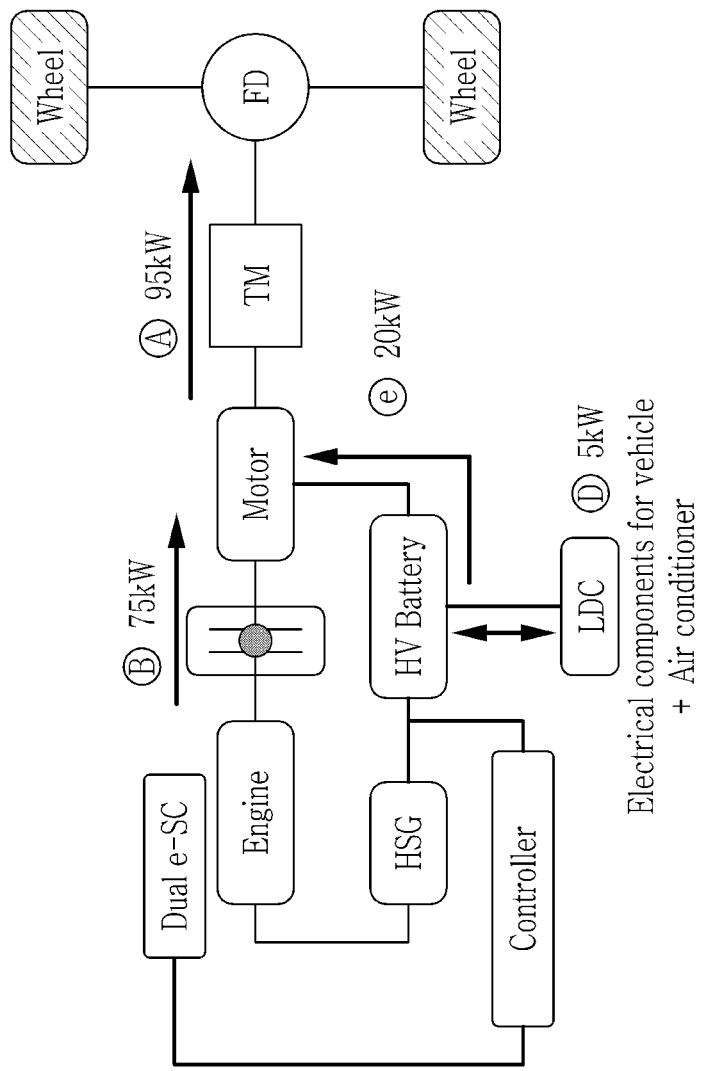
FIGS. 13 to 15 are views illustrating a process of distributing power to the engine and the drive motor in a low load state.

For example, referring to FIG. 13, when the traveling power of the vehicle is about 95 kW, the controller 90 may be configured to determine the operation mode of the electric superchargers so that the engine 10 outputs the optimum power of about 75 kW. In particular, when the electrical component power required for the electrical components and the air conditioner power required for the air conditioner are about 5 kW, the controller 90 may be configured to adjust the sum of power so that the sum of power of about 5 kW may be supplied to the electrical components and the air conditioner from the battery 70, and the controller 90 may be configured to operate the drive motor 50 to output the remaining power of about 20 kW except for the maximum power of about 75 kW from the engine 10 from the traveling power of about 95 kW.

Alternatively, when the required power of the driver in the low load state (low tip-in (LTI)) and the SOC of the battery 70 is the preset value or greater, the controller 90 may be configured to operate the vehicle in the EV mode. Accordingly, the controller 90 may be configured to disengage the clutch 60 disposed between the engine 10 and the drive motor 50 so that only the drive motor 50 outputs the traveling power of the vehicle. In other words, the controller 90 may be configured to stop the operations of the engine 10 and the electric superchargers and calculate the sum of power of the electrical component load required for the electrical components and the air conditioner load required for the air conditioner.

Figure 14:
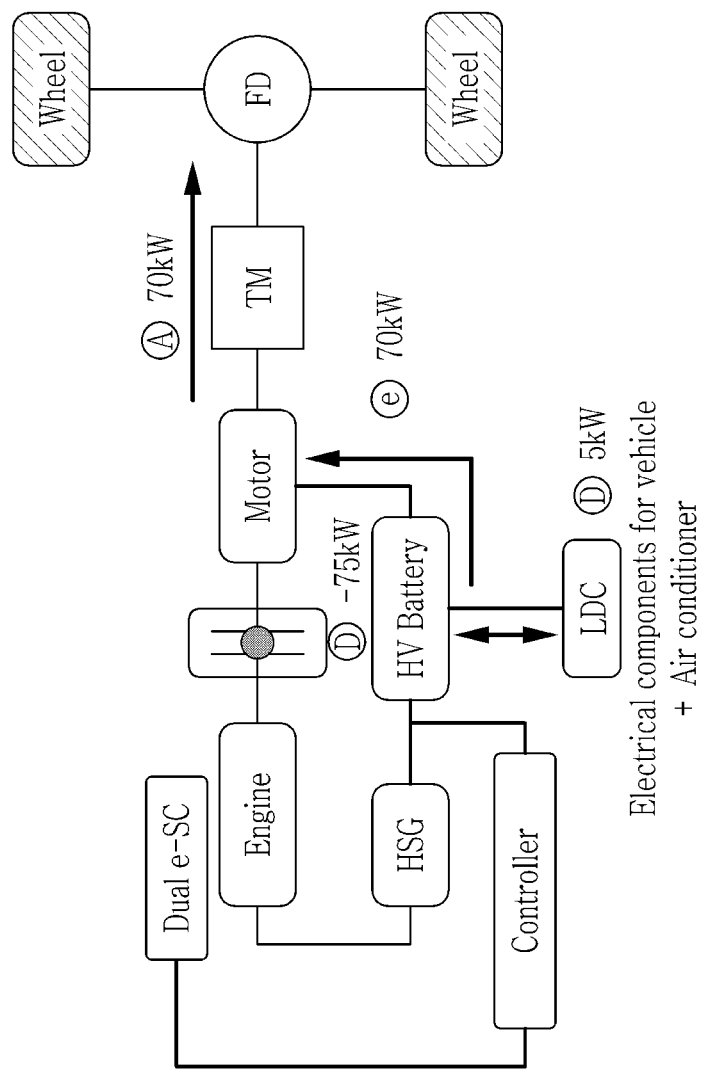

Further, the controller 90 may be configured to output the power required for the traveling load from the drive motor 50 and output the sum of power required for the electrical components and the air conditioner from the battery 70. For example, referring to FIG. 14, when the traveling power of the vehicle is about 70 kW and the sum of power of the electrical component power and the air conditioner power is 5 kW, the sum of power of about 5 kW may be supplied from the battery 70 and the traveling power of about 70 kW may be output from the drive motor 50.

Particularly, when the required power of the driver is in the low load state and the SOC of the battery 70 is the preset value or greater, the vehicle may be driven in the HEV mode or the EV mode based on the SOC of the battery 70 and the engagement degree of the accelerator pedal sensor configured to determine the required power of the driver. For example, when the required power of the driver is in the low load state and the SOC of the battery 70 is in a region equal to or greater than the middle region, the controller 90 may be configured to operate the vehicle in the HEV mode. Further, when the required power of the driver is in the low load state and the SOC of the battery 70 is in a region equal to or less than the low region, the controller 90 may be configured to operate the vehicle in the EV mode.

When the required power of the driver is in the low load state (low tip-in (LTI)) and the SOC of the battery 70 is less than the preset value, the controller 90 may be configured to calculate the traveling power required for the traveling of the vehicle (e.g. operation of the vehicle) based on the required power of the driver. Further, the controller 90 may be configured to operate the engine 10 to output the optimum power so that the engine 10 operates at the optimum efficiency point, and the electric superchargers do not operate.

The controller 90 may be configured to calculate the sum of power generated by adding up the electrical component power required for the electrical components and the air conditioner power required for the air conditioner. In particular, since the SOC is low, the sum of power necessary for the operations of the electrical components and the air conditioner uses a part of the power output from the engine 10. In other words, the controller 90 may be configured to operate the drive motor 50 as an electric generator, thereby producing the sum of power and the charging power for charging the battery 70 using a part of the maximum power output from the engine 10. Therefore, the power except for the sum of power and the charging power from the maximum power from the engine 10 may be output as the traveling power of the vehicle.

Figure 15:
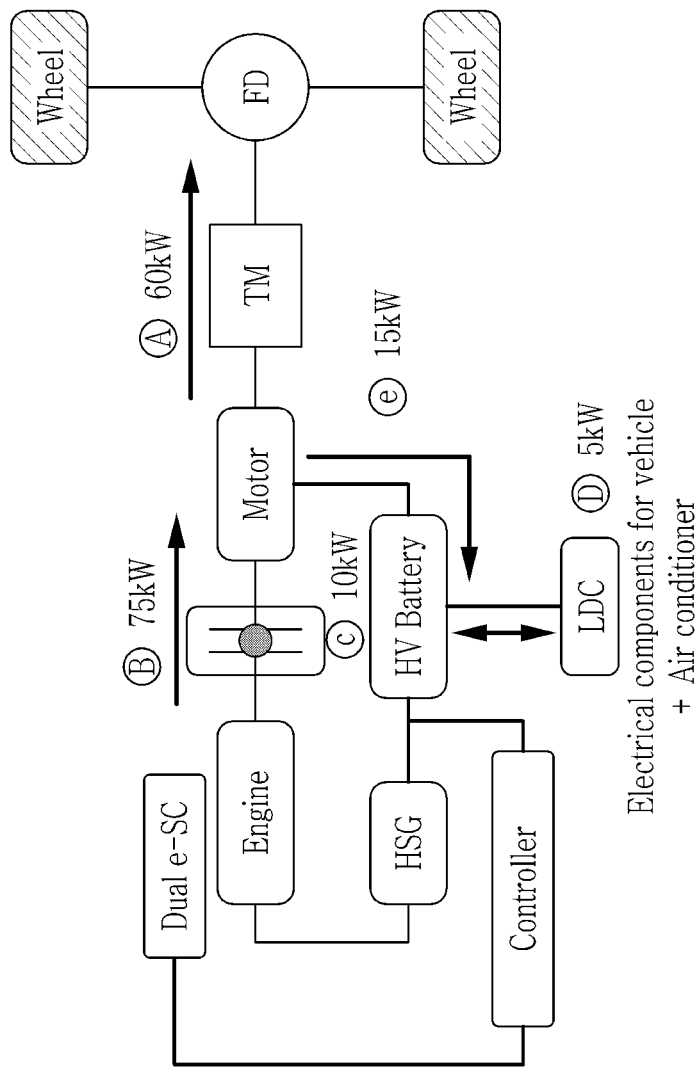

For example, referring to FIG. 15, when the optimum power output from the engine 10 is about 75 kW, the controller 90 may be configured to operate the engine 10 to output the maximum power of about 75 kW. In particular, when the electrical component power required for the electrical components and the air conditioner power required for the air conditioner are about 5 kW, the controller 90 may be configured to operate the drive motor 50 as an electric generator to generate electric power of about 5 kW from the maximum power output from the engine 10, and supply the electric power to the electrical components and the air conditioner. Further, the battery 70 may be charged with the charging power or about 10 kW for charging the battery 70. Therefore, the power of about 60 kW except for the sum of power of about 5 kW and the charging power of about 10 kW from the optimum power of about 75 kW from the engine 10 may be output as the traveling power.

As described above, when the SOC of the battery 70 is in the low region in the middle load state, a part of the maximum power from the engine 10 may be used as electric power required to operate the electrical components and the air conditioner, and a part of the power may be used to charge the battery 70. While the exemplary embodiments of the present invention have been described above, the present invention is not limited thereto, and various modifications may be made and performed within the scope of the claims, the detailed description of the invention, and the accompanying drawings, and also fall within the scope of the invention.

DESCRIPTION OF SYMBOLS

10: Engine
11: Combustion chamber
13: Intake manifold
14: Throttle valve
15: Exhaust manifold
17: Exhaust line
19: Catalyst converter
21: First intake line
22: Second intake line
23: Connection line
24: Main intake line
25: First intake valve
26: Second intake valve
27: Bypass valve
29: Air cleaner
31: First electric supercharger
32: Second electric supercharger
35: Auxiliary intercooler
36: Main intercooler
40: HSG
50: Drive motor
60: Clutch
70: Battery
80: Transmission
90: Controller
100: APS

What is claimed is:

1. An apparatus for controlling a hybrid vehicle, comprising:
    an engine configured to generate power by combusting fuel;
    a drive motor configured to supplement the power from the engine and operate selectively as an electric generator to produce electrical energy;
    a clutch disposed between the engine and the drive motor;
    a battery configured to supply electrical energy to the drive motor and be charged with the electrical energy produced by the electric generator;
    multiple electric superchargers including a first electric supercharger and a second electric supercharger installed in multiple intake lines through which outside air to be supplied into a combustion chamber of the engine flows; and
    a controller configured to determine an operation mode of the multiple electric superchargers based on required power of a driver and a state of charge (SOC) of the battery and adjust power output from the engine and power output from the drive motor,
    wherein the required power is determined based on an engagement degree of an accelerator pedal position sensor (APS) mounted within the vehicle and the required power is divided into a highest load state, a high load state, a middle load state, and a low load state,
    wherein the controller is configured to determine a traveling power of the vehicle to be transmitted to drive wheels of the vehicle based upon the required power of the driver;
    wherein when the required power is in the highest load state and the SOC of the battery is a preset value or greater, the controller is configured to:
        determine the operation mode of the multiple electric superchargers so that the engine outputs a maximum power, wherein the determined operation mode of the multiple electric superchargers is a series mode and, wherein in the series mode, the outside air is primarily boosted by the first electric supercharger and is additionally boosted by the second electric supercharger;

operate the engine to output the maximum power;
operate the drive motor to output a remaining power that is equal to the traveling power of the vehicle less the maximum power output from the engine;
operate the battery to supply:
  the drive motor with the remaining power; and
  the multiple electric superchargers, electrical components, and an air conditioner with supercharger power required for the electric superchargers, electrical component power required for the electrical components, and air conditioner power required for the air conditioner respectively; and
output the traveling power of the vehicle to the drive wheels;
wherein, when the required power is in the highest load state and the SOC of the battery is less than the preset value, the controller is further configured to:
  determine the operation mode of the multiple electric supercharges to be the series mode so that the engine outputs the maximum power;
  operate the engine to output the maximum power;
  operate the drive motor as an electric generator to generate the supercharger power, the electrical component power, and the air conditioner power from the maximum power output by the engine; and
  operate the drive motor to supply the supercharger power, the electrical component power, and the air conditioner power to the multiple electric superchargers, the electrical components, and the air conditioner, respectively.

2. The apparatus of claim 1, wherein when the required power is in the high load state and the SOC of the battery is the preset value or greater, the controller is configured to:
  determine the operation mode of the multiple electric superchargers to be the series mode so that the engine outputs the maximum power;
  operate the engine to output the maximum power;
  operate the drive motor to output the remaining power;
  operate the battery to supply:
    the drive motor with the remaining power; and
    the multiple electric superchargers, the electrical components, and the air conditioner with the supercharger power, the electrical component power, and the air conditioner power, respectively.

3. The apparatus of claim 1, wherein when the required power is in the high load state and the SOC of the battery is less than the preset value, the controller is configured to:
  determine the operation mode of the multiple electric superchargers to be the series mode so that the engine outputs the maximum power;
  operate the engine to output the maximum power;
  operate the drive motor as an electric generator to generate the supercharger power, the electrical component power, and the air conditioner power from the maximum power output by the engine; and
  operate the drive motor to supply the supercharger power, the electrical component power, and the air conditioner power to the multiple electric superchargers, the electrical components, and the air conditioner, respectively.

4. A method of controlling a hybrid vehicle including a drive motor and an engine configured to generate power necessary for traveling of a vehicle; and multiple electric superchargers including a first electric supercharger and a second electric supercharger installed in multiple intake lines through which outside air to be supplied into a combustion chamber of the engine flows, the method comprising:
  determining, by a controller, required power of a driver based on an engagement degree of an accelerator pedal; and
  determining, by the controller, an operation mode of the multiple electric superchargers based on the required power and a state of charge (SOC) of a battery and adjusting a power output from the engine and a power output from the drive motor,
  wherein the required power is determined based on an engagement degree of an accelerator pedal position sensor (APS) mounted within the vehicle and divided into a highest load state, a high load state, a middle load state, and a low load state,
  determining, by the controller, a traveling power of the vehicle to be transmitted to drive wheels of the vehicle based upon the required power of the driver;
  wherein when the required power is in the highest load state and the SOC of the battery is a preset value or greater, the method includes:
    determining, by the controller, the operation mode of the multiple electric superchargers so that the engine outputs a maximum power, wherein the determined operation mode of the multiple electric superchargers is a series mode, and wherein in the series mode, the outside air is primarily boosted by the first electric supercharger and is additionally boosted by the second electric supercharger;
    operating, by the controller, the engine to output the maximum power;
    operating, by the controller, the drive motor to output a remaining power that is equal to the traveling power of the vehicle less the maximum power output from the engine;
    supplying, by the battery:
      the drive motor with the remaining power; and
      the multiple electric superchargers, electrical components, and an air conditioner with supercharger power required for the electric superchargers, electrical component power required for the electrical components, and air conditioner power required for the air conditioner, respectively; and
    outputting the traveling power of the vehicle to the drive wheels;
  wherein, when the required power is in the highest load state and the SOC of the battery is less than the preset value, the method further includes:
    determining, by the controller, the operation mode of the multiple electric superchargers to be the series mode so that the engine outputs the maximum power;
    operating, by the controller, the engine to output the maximum power;
    operating, by the controller, the drive motor as an electric generator to generate the supercharger power, the electrical component power, and the air conditioner power from the maximum power output by the engine; and
    operating, by the controller, the drive motor to supply the supercharger power, the electrical component power, and the air conditioner power to the multiple electric superchargers, the electrical components, and the air conditioner, respectively.

5. The method of claim 4, wherein when the required power is in the high load state and the SOC of the battery is the preset value or greater, the method includes:
   determining, by the controller, the operation mode of the multiple electric superchargers to be the series mode so that the engine outputs the maximum power;
   operating, by the controller, the engine to output the maximum power;
   operating, by the controller, the drive motor to output the remaining power;
   operating, by the controller, the battery to supply:
      the drive motor with the remaining power; and
      the multiple electric superchargers, the electrical components, and the air conditioner with the supercharger power, the electrical component power, and the air conditioner power.

6. The method of claim 4, wherein when the required power is in the high load state and the SOC of the battery is less than the preset value, the method includes:
   determining, by the controller, the operation mode of the multiple electric superchargers to be the series mode so that the engine outputs the maximum power;
   operating, by the controller, the engine to output the maximum power;
   operating, by the controller, the drive motor as an electric generator to generate the supercharger power, the electrical component power, and the air conditioner power from the maximum power output by the engine; and
   operating, by the controller, the drive motor to supply the electrical component power, and the air conditioner power to the multiple electric superchargers, the electrical components, and the air conditioner, respectively.

7. The method of claim 4, wherein when the required power is in the middle load state and the SOC of the battery is less than the preset value, the method includes:
   determining, by the controller, the operation mode of the multiple electric superchargers to be a single mode or a parallel mode so that the engine outputs an optimum power corresponding to an optimum efficiency point of the engine;
   operating, by the controller, the engine to output the optimum power;
   operating, by the controller, the drive motor as an electric generator to generate a charging power for charging the battery, the supercharger power, the electrical component power, and the air conditioner power from the optimum power output by the engine; and
   operating, by the controller, the drive motor to supply:
      the supercharger power, the electrical component power, and the air conditioner power to the multiple electric superchargers, the electrical components, and the air conditioner, respectively; and
      a predetermined amount of charging power to the battery.

8. The method of claim 4, wherein when the required power is in the low load state and the SOC of the battery is the preset value or greater, the method includes:
   stopping, by the controller, operations of the multiple electric superchargers;
   operating, by the controller, the drive motor to output the traveling power of the vehicle; and
   operating, by the controller, the battery to output the sum of the electrical component power and the air conditioner power.

9. The method of claim 4, wherein when the required power is in the low load state and the SOC of the battery is less than the preset value, the method includes:
   operating, by the controller, the engine to output an optimum power corresponding to an optimum efficiency point of the engine;
   stopping, by the controller, operations of the multiple electric superchargers;
   operating, by the controller, the drive motor as an electric generator to generate a charging power for charging the battery, the electrical component power required for the electrical components, and the air conditioner power from the optimum power output by the engine; and
   operating, by the controller, the drive motor to supply:
      the electrical component power and the air conditioner power to the electrical components, and the air conditioner, respectively; and
      the charging power to the battery.

* * * * *